United States Patent Office 3,483,221
Patented Dec. 9, 1969

---

3,483,221
1 - (ISOPROPYLAMINO)-2-HYDROXY-3-(ALKENYL-OXYPHENOXY) - PROPANES AND THE SALTS THEREOF

Max Wilhelm, Allschwil, Switzerland, Hans Ulrich Daeniker, Clifton, N.J., and Karl Schenker, Binningen, and Paul Schmidt, Therwil, Switzerland, assignors to Ciba Corporation, Summit, N.J., a corporation of Delaware
No Drawing. Continuation-in-part of application Ser. No. 554,360, June 1, 1966. This application Oct. 28, 1968, Ser. No. 771,329
Claims priority, application Switzerland, Sept. 10, 1964, 11,801/64; June 11, 1965, 8,193/65; Mar. 18, 1966, 3,973/66
Int. Cl. C07c 87/28; A61k 27/00
U.S. Cl. 260—326.14                     7 Claims

ABSTRACT OF THE DISCLOSURE

New unsaturated amines and their salts. In particular this invention concerns the 1-(isopropylamino)-2-hydroxy-3-(ortho-alkenyloxyphenoxy)-propanes of the formula

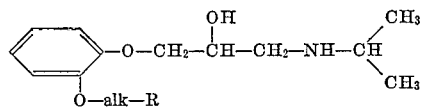

where alk represents an alkylene radical and R an unsaturated aliphatic hydrocarbon residue. The compounds are useful for the treatment of cardiac and circulatory diseases.

---

Cross-references to other applications

This is a continuation-in-part of our application Ser. No. 554,360, filed June 1, 1966 which in turn is a continuation-in-part of our application Ser. No. 480,467, filed Aug. 17, 1965 and now both abandoned.

The present invention relates to new unsaturated amines and their salts. Especially it concerns the 1-isopropylamino-2-hydroxy-3-[ortho - (R-alk-O) - phenoxy]-propanes of the formula

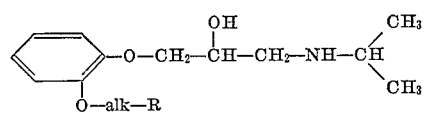

where alk represents an alkylene radical and R an unsaturated aliphatic hydrocarbon residue.

The alkylene radical is especially a lower alkylene radical containing 1 to 3 carbon atoms, such as propylene or ethylene radical or above all the methylene radical.

The residue R is above all a lower alkenyl residue, e.g. an alkenyl radical having 2 to 6, especially 2 to 4, above all 2 or 3, carbon atoms, such as a vinyl or propenyl radical, or a linear or branched butenyl, pentenyl or hexenyl residue, bound in any desired position. Advantageously R represents the isopropenyl radical and above all the vinyl radical.

The new compounds possess valuable pharmacological properties, especially an inhibiting effect upon adrenergic β-receptors. Especially valuable is 1-isopropylamino-2-hydroxy-3-(orthomethallyloxy-phenoxy)-propane of the formula

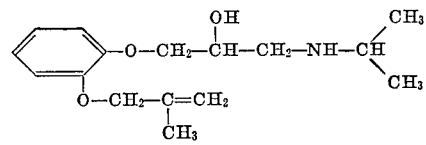

and primarily 1-isopropylamino-2-hydroxy - 3 - (orthoallyloxyphenoxy)-propane of the formula

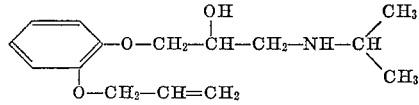

which, for example, in the cat narcotized with dial or in the unnarcotized dog inhibits the lowering of the blood pressure produced by isoproterenol when administered in doses of 0.01–1 mg./kg. i.v. or 2–3 mg./kg. p.o. They are capable of suppressing digitalis-induced extrasystoles as shown, for example, in experiments with a dosis of 03–1 mg./kg. i.v. in the narcotized dog. The compounds can therefore be used as medicaments for the treatment of cardiac and circulatory diseases.

The new compounds are manufactured by known methods.

Advantageously, a 1-halogeno-2-hydroxy-3-[ortho-(R-alk-O)-phenoxypropane or 3-[ortho(R-alk-O)-phenoxy]-1,2-epoxypropane where alk and R have the above meanings—is reacted with isopropylamine.

Halogen atoms are more especially chlorine, bromine or iodine atoms.

The starting materials are known or can be prepared by known methods.

Depending on the process conditions and starting materials used the final products are obtained in the free form or in the form of their salts which are likewise included in this invention. The salts of the final products can be converted into the free bases e.g. with alkalies or with ion exchange resins. When the bases are reacted with organic or inorganic acids, especially with acids capable of forming therapeutically acceptable salts, they yield salts. As such acids there may be mentioned, for example: hydrohalic, sulphuric, phosphoric acids, nitric or perchloric acid; aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, paraaminobenzoic, anthranilic, para-hydroxybenzoic, salicylic, para-aminosalicylic, embonic, methanesulphonic, ethanesulphonic, hydroxyethanesulfonic, ethylenesulphonic acid; halobenzenesulphonic, toluenesulphonic, naphthalenesulphonic or sulphanilic acid; methionine, tryptophan, lysine or arginine.

These or other salts of the new compounds e.g. their picrates, may also be used for purifying the resulting free bases by converting the free bases into salts, isolating the salts and separating the bases again from the salts. In view of the close relationship between the new compounds in the free form and in the form of their salts, what has been said above and hereinafter with reference to the free bases concerns also the corresponding salts wherever this is suitable and useful.

The invention includes also any variant of the present process in which an intermediate obtained at any stage of the process is used as starting material and any remaining step/steps is/are carried out or the process is discontinued at any stage thereof, or in which the starting materials are formed under the reaction conditions, or in which the reactants are used in the form of their salts.

The new compounds may be in the form of racemates or in the form of the antipodes. The racemates can be resolved into the antipodes in usual manner.

The new compounds may be used, for example, in the form of pharmaceutical preparations containing them or their salts in conjunction or admixture with organic or inorganic, solid or liquid pharmaceutical excipients suitable for enteral or parenteral administration. Suitable excipients are substances that do not react with the new compounds e.g. water, gelatin, lactose, starches, stearyl alcohol, magnesium stearate, talcum, vegetable oils, benzyl alcohols, gums, propyleneglycols, white petroleum jelly, or other known medicinal excipients. The pharmaceutical preparations may be e.g. tablets, dragées or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain other therapeutically useful substances. The pharmaceutical preparations are formulated by usual methods.

The following examples illustrate the invention.

Example 1

A solution of 3.7 g. of 3-(ortho-methallyloxy-phenoxy)-1,2-epoxypropane and 3.7 g. of isopropylamine in 5 ml. of ethanol is refluxed for 4 hours. The excess amine and the alcohol are evaporated under vacuum. The residue is dissolved in 100 ml. of 2 N-hydrochloric acid and extracted with diethyl ether. The hydrochloric layer is isolated and rendered alkaline by addition of 10 N-sodium hydroxide solution. The separated base is extracted with ether. On drying and evaporating the solvent, an oil remains which is dissolved in 10 ml. of absolute ethanol, and one equivalent of ethanolic hydrochloric acid is added. On addition of ether the hydrochloride of 1-isopropylamino - 2 - hydroxy - 3 - (ortho-methallyloxy-phenoxy)-propane of the formula

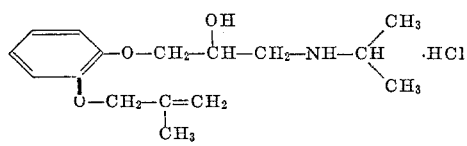

settles out in crystalline form; it melts at 89 to 91° C.

The starting material is prepared in the following manner:

A mixture of 110 g. of pyrocatechol, 90 g. of methallyl chloride, 150 g. of potassium carbonate and 1 litre of acetone is heated at the boil with stirring for 4 hours. The solid matter is then filtered off and the filtrate evaporated to dryness under vacuum. The residue is distilled in a water-jet vacuum, whereupon ortho-methallyloxy-phenol passes over between 114 and 120° C. under 12 mm. Hg pressure.

A mixture of 7.0 g. of ortho-methallyloxyphenol, 7.0 g. of epichlorohydrin, 7.0 g. of potassium carbonate and 35 ml. of acetone is stirred at the boil for 15 hours. The potassium carbonate is then filtered off and the residue evaporated under vacuum. The evaporation residue is dissolved in ether and the extract agitated with 2 N-sodium hydroxide solution. After drying and evaporating the ether, 3-(ortho-methallyloxy-phenoxy)-1,2-epoxypropane is obtained which distills at 100 to 110° C. under a pressure of 0.15 mm. Hg.

Example 2

Tablets containing 20 mg. of active substance are prepared with the following ingredients:

| | Mg. |
|---|---|
| 1 - isopropylamino - 2 - hydroxy - 3 - (ortho - methallyloxy-phenoxy)-propane hydrochloride | 20 |
| Starch | 60 |
| Lactose | 50 |
| Colloidal silicic acid | 5 |
| Talc | 9 |
| Magnesium stearate | 1 |
| | 145 |

Example 3

For the preparation of capsules the following mixture is used:

| | G. |
|---|---|
| 1 - isopropylamino - 2 - hydroxy - 3 - (ortho - methallyloxy-phenoxy)-propane hydrochloride | 500 |
| Talc | 80 |
| Colloidal silicic acid | 20 |

The active ingredient is intimately mixed with talc and colloidal silicic acid, the mixture passed through a sieve (0.5 mm. mesh) and filled in portions of 21 mg. into hard gelatine capsules of a suitable size.

Example 4

The new compounds can be used in the form of pharmaceutical preparations containing them in admixture or conjunction with vasodilative especially coronary-dilative, compounds, primarily vasodilative esters of nitrous or nitric acid, above all nitro-glycerin, penta-erythritol-tetranitrate, triethanolamine trinitrate, nitromannitol, and/or papaverine, theobromine, theophylline, hydroxyethyl-theophylline, dihydroxy-propyltheophylline, and/or other coronary-dilative derivatives of theobromine or theophylline, and/or 2-ethyl-3(3',5'-diiodo - 4' - hydroxybenzoyl)-benzofuran, 2,6 - bis-(diethanolamino)-4,8-dipiperidino-pyrimido(5,4-d)pyrimidine and/or N-3'-phenylpropyl - (2') - 1,1 - diphenylpropyl-(3)-amine and/or adenosine.

The tablets are formulated so that the daily dose amount to 5–50 mg. of 1-isopropylamino-2-hydroxy-3-(ortho-allyloxy-phenoxy)-propane or 1-isopropylamino-2-hydroxy-3-(ortho-methallyloxy-phenoxy)-propane hydrochloride and 5–50 mg. of penta-erythritol tetranitrate, advantageously with three administrations per day.

Example 5

A solution of 15 g. of 3-(ortho-allyloxy-phenoxy)-1,2-epoxypropane and 15 g. of isopropylamine in 20 ml. of ethanol is refluxed for 4 hours. The excess amine and the alcohol are then distilled off under vacuum, to leave 1-isopropylamino - 2 - hydroxy - 3 - (ortho - allyloxyphenoxy)-propane of the formula

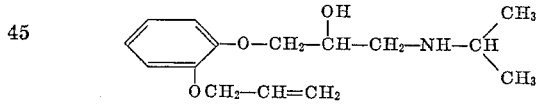

which melts at 75° C. to 80° C. after recrystallization from hexane.

The starting material is prepared thus:

75 g. of pyrocatechol monoallyl ether, 75 g. of epichlorohydrin, 75 g. of potassium carbonate and 400 ml. of acetone are stirred and heated at the boil for 12 hours. The potassium carbonate is then filtered off. The solvent is distilled off in a water-jet vacuum. The residual oil is dissolved in ether and agitated with 2 N-sodium hydroxide solution. The ether is separated, dried and distilled off. The residue is distilled in a water-jet vacuum. 3-(orthoallyloxy-phenoxy) - 1,2 - epoxypropane passes over at 145° C. to 157° C. under 11 mm. Hg pressure.

Example 6

Tablets are prepared which contain 20 mg. of active substance and have the following composition:

| | Mg. |
|---|---|
| 1 - isopropylamino - 2 - hydroxy - 3 - (ortho-allyloxy-phenoxy)-propane | 20 |
| Starch | 60 |
| Lactose | 50 |
| Colloidal silicic acid | 5 |
| Talcum | 9 |
| Magnesium stearate | 1 |
| | 145 |

Example 7

In the manufacture of capsules the following mixture is used:

| | G. |
|---|---|
| 1 - isopropylamino - 2 - hydroxy - 3 - (ortho-allyloxy - phenoxy) - propane | 2500 |
| Talcum | 80 |
| Colloidal silicic acid | 20 |

The active substance is intimately mixed with talcum and colloidal silicic acid, the mixture passed through a sieve (0.5 mm.) and 21 mg. portions of it filled into hard gelatine capsules.

Example 8

Ampoules containing 5 mg. of active substance per ml.:

| | Mg. |
|---|---|
| 1 - isopropylamino - 2 - hydroxy - 3 - (ortho-allyloxy - phenoxy) - propane | 5.0 |
| Sodium chloride | 7.72 |
| Sterile distilled water to make up 1.0 ml. | |

The sodium chloride is dissolved in part of the boiled water which has been cooled while a stream of nitrogen gas was passed through it, and the volume then made up to the prescribed volume with water that has been treated in the same manner. While nitrogen gas is being passed through, the solution is filled into 1 ml. ampoules, and the latter sterilized in an autoclave at 120° C. for 20 minutes. The sterilized solution has a pH of about 6.3.

Example 9

9.0 g. of isopropylamine are slowly added to a solution of 12.0 g. of 1-(ortho-allyloxy-phenoxy)-3-chloro-isopropanol in 50 ml. of alcohol, and the mixture heated at 70° C. for 5 hours, then evaporated under vacuum. The residue is dissolved in 2 N-hydrochloric acid and the solution extracted with ether. The aqueous layer is separated and rendered alkaline with sodium hydroxide solution and extracted with ether. After drying and evaporation of the solvent, an oil remains behind which slowly crystallizes. By recrystallization from hexane, 1-isopropylamino- - 2 - hydroxy - 3 - (ortho-allyloxy-phenoxy)-propane of the formula

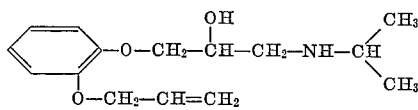

is obtained which melts 78–80° C. The hydrochloride melts at 107–109° C.

The 1-(ortho-allyloxy-phenoxy)-3 - chloro-isopropanol used as starting material is obtained by reacting 3-(ortho-allyloxy-phenoxy) - 1,2 - epoxypropane with hydrochloric acid. The compound boils at 115–125° C. under a pressure of 0.2 mm. Hg.

Example 10

26 grams of racemic 1-isopropylamino - 2 - hydroxy-3-(ortho-allyloxy-phenoxy)-propane and 14.8 g. of L-(+)-glutamic acid are dissolved in 50 ml. of water at 60–70° C. The solution is filtered and cooled to room temperature, and 200 ml. of absolute ethanol are then added. The crystalline precipitate which forms is recrystallized from methanol. The resulting glutaminate of (+)-1-isopropylamino-2-hydroxy-3 - (ortho-allyloxy-phenoxy)-propane is dissolved in water and the solution rendered alkaline by the addition of 10 N-sodium hydroxide solution. (+)-1-isopropylamino-2-hydroxy-3-(ortho-allyloxy-phenoxy)-propane settles out. After recrystallization from petroleum ether it melts at 60–62° C. and exhibits a specific rotation of $[\alpha]_D^{20°}=+6.2°$ ±0.5° (ethanol, c.=2%). The hydrochloride melts at 80–82° C. and has a specific rotation of $[\alpha]_D^{20}=+13°$ ±0.5° (water, c.=2%).

In an analogous manner, the levo-rotatory antipode can be separated from racemic 1-isopropylamino-2-hydroxy-3 - (ortho-allyloxy-phenoxy)-propane by means of D-(−)-glutamic acid. The 1-1-isopropylamino-2-hydroxy-3-(ortho-allyloxy-phenoxy)-propane hydrochloride melts at 80–82° C. and has a specific rotation of $[\alpha]_D^{20}=-13°$ ±0.5° (ethanol, c.=2%).

We claim:

1. A member selected from the group consisting of a compound of the formula

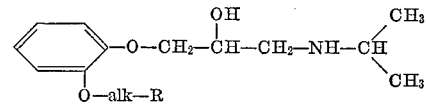

in which R stands for lower alkenyl and alk for lower alkylene, and acid addition salts thereof.

2. A product as claimed in claim 1, in which R stands for alkenyl having 2 to 4 carbon atoms and alk for alkylene having 1 to 3 carbon atoms.

3. A product as claimed in claim 1, in which R stands for alkenyl having 2 to 3 carbon atoms and alk for methylene.

4. 1 - isopropylamino - 2 - hydroxy - 3 - (ortho-methallyloxy-phenoxy)-propane or an acid addition salt thereof.

5. 1 - isopropylamino - 2 - hydroxy - 3 - (ortho-allyloxyphenoxy)-propane or an acid addition salt thereof.

6. A product as claimed in claim 5, the product being in its laevorotatory form.

7. A product as claimed in claim 5, the product being in its dextrorotatory form.

No references cited.

ROBERT V. HINES, Primary Examiner

U.S. Cl. X.R.

260—501.11, 501.12, 501.17, 501.19, 570.7, 567.5, 343.7, 348, 613; 424—280, 274, 330, 253, 285, 251

Disclaimer 3,483,221.—*Max Wilhelm*, Allschwil, Switzerland, *Hans Ulrich Daeniker*, Clifton, N.J., and *Karl Schenjer*, Binningen and *Paul Schmidt*, Therwil, Switzerland. 1-(ISOPROPYLAMINO)-2-HYDROXY-3-(ALKENYLOXY-PHENOXY)-PROPANES AND THE SALTS THEREOF. Patent dated Dec. 9, 1969. Disclaimer filed Oct. 22, 1984, by the assignee, *Ciba-Geigy Corp.*

Hereby enters this disclaimer to claims 1, 3, 6 and 7 of said patent.
[*Official Gazette January 15, 1985.*]